US008697757B2

(12) United States Patent
Koyama et al.

(10) Patent No.: US 8,697,757 B2
(45) Date of Patent: Apr. 15, 2014

(54) HYDROPHOBIC ORGANIC SOLVENT-DISPERSED SOL OF ANHYDROUS ZINC ANTIMONATE COLLOIDAL PARTICLES AND METHOD FOR PRODUCING THE SAME

(75) Inventors: Yoshinari Koyama, Sodegaura (JP); Tomonari Shinji, Sodegaura (JP); Osamu Fujimoto, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 546 days.

(21) Appl. No.: 13/054,202

(22) PCT Filed: Jul. 16, 2009

(86) PCT No.: PCT/JP2009/062900
§ 371 (c)(1),
(2), (4) Date: Jan. 18, 2011

(87) PCT Pub. No.: WO2010/008050
PCT Pub. Date: Jan. 21, 2010

(65) Prior Publication Data
US 2011/0114871 A1    May 19, 2011

(30) Foreign Application Priority Data
Jul. 17, 2008 (JP) .................................. 2008-185834

(51) Int. Cl.
*B01J 13/00*    (2006.01)
*C09K 5/00*    (2006.01)
*F21V 9/06*    (2006.01)
*C08K 3/22*    (2006.01)
*C09D 1/00*    (2006.01)

(52) U.S. Cl.
USPC .......... 516/34; 516/33; 524/410; 106/287.14; 106/287.19; 252/62; 252/75; 252/587; 252/589

(58) Field of Classification Search
USPC ................... 516/33, 34, 36, 88, 91; 524/410; 106/287.14, 287.19; 252/62, 75, 587, 252/589
See application file for complete search history.

(56) References Cited

U.S. PATENT DOCUMENTS

| 6,093,749 | A | 7/2000 | Watanabe et al. | |
| 6,311,545 | B1 | 11/2001 | Tamaki et al. | |
| 6,355,694 | B1 * | 3/2002 | Suzuki et al. | 516/88 |
| 7,157,024 | B2 * | 1/2007 | Isaji et al. | 106/287.19 |
| 2003/0193037 | A1 * | 10/2003 | Koyanagi et al. | 252/1 |
| 2004/0086724 | A1 * | 5/2004 | Suzuki et al. | 106/286.2 |
| 2005/0154124 | A1 * | 7/2005 | Yoshitake et al. | 524/859 |
| 2005/0239907 | A1 * | 10/2005 | Tanegashima et al. | 516/88 |
| 2006/0025518 | A1 * | 2/2006 | Koyama et al. | 524/588 |

FOREIGN PATENT DOCUMENTS

| EP | 0 686 600 A1 | 12/1995 |
| EP | 0 909 784 A1 | 4/1999 |
| EP | 1 077 236 A1 | 2/2001 |
| EP | 1 589 078 A1 | 10/2005 |
| JP | A-11-258193 | 9/1999 |
| JP | A-11-314918 | 11/1999 |
| JP | A-2000-281344 | 10/2000 |
| JP | A-2005-200294 | 7/2005 |
| JP | A-2005-330177 | 12/2005 |
| JP | 2008064693 A * | 3/2008 |

OTHER PUBLICATIONS

Machine Translation of Publ. No. JP 2008-064693, published Mar. 2008, Japan patent Office, Tokyo, Japan, obtained online @ http://dossier1.ipdl.inpit.go.jp/AIPN/odse_top_dn.ipdl?N0000=7400 (Downloaded Jun. 12, 2013).*
International Search Report issued in Application No. PCT/JP2009/062900; Dated Oct. 6, 2009 (With Translation).
Jun. 14, 2013 Supplementary Search Report issued in European Patent Application No. EP 09 79 7974.

* cited by examiner

*Primary Examiner* — Daniel S Metzmaier
(74) *Attorney, Agent, or Firm* — Oliff PLC

(57) ABSTRACT

A hydrophobic organic solvent-dispersed sol of anhydrous zinc antimonate colloidal particles and a method for producing the same. The hydrophobic organic solvent-dispersed sol includes surface-modified anhydrous zinc antimonate colloidal particles dispersed in a hydrophobic organic solvent having a water solubility of 0.002 to 12% by mass. The surface-modified anhydrous zinc antimonate colloidal particles are formed by: coating outer surfaces of anhydrous zinc antimonate colloidal particles (A) serving as cores with at least one substance (B) of colloidal particles of a composite oxide containing silica and stannic oxide or silica and antimony pentoxide at a silica/stannic oxide or silica/antimony pentoxide ratio of 0.1 to 10, an oligomer of the colloidal particles, or a mixture of the colloidal particles and the oligomer to form modified anhydrous zinc antimonate colloidal particles (C); and bonding an organosilicon compound and an amine compound to surfaces of the colloidal particles (C).

11 Claims, No Drawings

HYDROPHOBIC ORGANIC SOLVENT-DISPERSED SOL OF ANHYDROUS ZINC ANTIMONATE COLLOIDAL PARTICLES AND METHOD FOR PRODUCING THE SAME

TECHNICAL FIELD

The present invention relates to: a hydrophobic organic solvent-dispersed sol of anhydrous zinc antimonate colloidal particles, wherein surface-modified anhydrous zinc antimonate colloidal particles are dispersed in a hydrophobic organic solvent having a water solubility of 0.002 to 12% by mass, the surface-modified anhydrous zinc antimonate colloidal particles being formed by coating outer surfaces of anhydrous zinc antimonate colloidal particles (A) serving as cores with at least one substance (B) of colloidal particles of a composite oxide containing silica and stannic oxide or silica and antimony pentoxide at a silica/stannic oxide or silica/antimony pentoxide mass ratio of 0.1 to 10, an oligomer of the colloidal particles, and a mixture of the colloidal particles and the oligomer to form modified anhydrous zinc antimonate colloidal particles (C), and by bonding an organosilicon compound and an amine compound to surfaces of the colloidal particles (C); and a method for producing the sol.

The sol of the present invention, in which surface-modified anhydrous zinc antimonate colloidal particles are dispersed in a hydrophobic organic solvent having a water solubility of 0.002 to 12% by mass, is used in various applications such as transparent ultraviolet absorption materials, transparent heat ray absorption materials, high refractive index hard coating agents, and inhibitors that are applied to resins, plastics, glass, and the like.

BACKGROUND ART

As for a metal oxide sol including a hydrophobic organic solvent as the dispersion medium, for example, known is a method for producing an organic solvent dispersed inorganic oxide sol in which inorganic oxide particles having a surface with a silicon atom to which a $C_{3-12}$ primary alkoxy group is bonded are stably dispersed in an organic solvent such as methyl ethyl ketone (see Patent Document 1).

Furthermore, there has been disclosed a sol that includes an aqueous sol or an organic solvent-dispersed sol of anhydrous zinc antimonate as a core coated with a silicon-containing substance such as a silane coupling agent and a silylation agent and includes an amine or an oxycarboxylic acid (see Patent Document 2).

There has also been disclosed a stable sol that includes modified stannic oxide-zirconium oxide composite colloidal particles having a particle diameter of 4.5 to 60 nm and a method for producing the sol. The modified stannic oxide-zirconium oxide composite colloidal particles include, as cores, composite colloidal particles of stannic oxide-zirconium oxide having a structure in which colloidal particles of stannic oxide are bonded with colloidal particles of zirconium oxide at a $ZrO_2/SnO_2$ ratio of 0.02 to 1.0 based on weight of these oxides, having a particle diameter of 4 to 50 nm, and having a surface coated with tungsten oxide-stannic oxide-silicon dioxide composite colloidal particles that have a $WO_3/SnO_2$ mass ratio of 0.1 to 100, a $SiO_2/SnO_2$ mass ratio of 0.1 to 100, and a particle diameter of 2 to 7 nm. The sol has a total metal oxide content of 2 to 50% by mass (see Patent Document 3).

RELATED ART DOCUMENTS

Patent Documents

Patent Document 1: Japanese Patent Application Publication No. JP-A-2005-200294
Patent Document 2: Japanese Patent Application Publication No. JP-A-11-314918
Patent Document 3: Japanese Patent Application Publication No. JP-A-2000-281344

DISCLOSURE OF THE INVENTION

Problem to be Solved by the Invention

By the method of direct reaction of a silicon-containing substance with an anhydrous zinc antimonate aqueous sol according to Patent Document 2, the particle diameter of aggregate increases in the sol when the dispersion medium is replaced from an aqueous sol to an organic solvent-dispersed sol. Thus, the method is not satisfactory for obtaining an organic solvent-dispersed sol keeping dispersibility of the aqueous sol. In particular, when a highly hydrophobic organic solvent such as methyl ethyl ketone and xylene is used as a dispersion medium, the method is not sufficient for dispersing anhydrous zinc antimonate colloidal particles in a state close to primary particle diameter without aggregation.

In order to solve the problems described above, it is an object of the present invention to provide an anhydrous zinc antimonate colloidal particle sol having sufficiently high dispersibility even in a highly hydrophobic organic solvent and a method for producing the sol. Specifically, the present invention provides a hydrophobic organic solvent-dispersed sol of anhydrous zinc antimonate colloidal particles, wherein surface-modified anhydrous zinc antimonate colloidal particles are dispersed in a hydrophobic organic solvent having a water solubility of 0.002 to 12% by mass, the surface-modified anhydrous zinc antimonate colloidal particles being formed by coating outer surfaces of anhydrous zinc antimonate colloidal particles (A) serving as cores with at least one substance (B) of colloidal particles of a composite oxide containing silica and stannic oxide or silica and antimony pentoxide at a silica/stannic oxide or silica/antimony pentoxide mass ratio of 0.1 to 10, an oligomer of the colloidal particles, and a mixture of the colloidal particles and the oligomer to form modified anhydrous zinc antimonate colloidal particles (C), and by bonding an organosilicon compound and an amine compound to surfaces of the colloidal particles (C). By bonding both the organosilicon compound and the amine compound to the surfaces of the modified anhydrous zinc antimonate colloidal particles (C), the sol in which anhydrous zinc antimonate colloidal particles are well dispersed in a hydrophobic organic solvent and which has not been obtained conventionally can be provided.

Means for Solving the Problem

A first aspect of the present invention is a hydrophobic organic solvent-dispersed sol of anhydrous zinc antimonate colloidal particles, wherein surface-modified anhydrous zinc antimonate colloidal particles are dispersed in a hydrophobic organic solvent having a water solubility of 0.002 to 12% by mass, the surface-modified anhydrous zinc antimonate colloidal particles being formed by coating outer surfaces of anhydrous zinc antimonate colloidal particles (A) serving as cores with at least one substance (B) of colloidal particles of a composite oxide containing silica and stannic oxide or silica and antimony pentoxide at a silica/stannic oxide or silica/ antimony pentoxide mass ratio of 0.1 to 10, an oligomer of the colloidal particles, and a mixture of the colloidal particles and the oligomer to form modified anhydrous zinc antimonate colloidal particles (C), and by bonding an organosilicon compound and an amine compound to surfaces of the colloidal particles (C).

As a second aspect, in the hydrophobic organic solvent-dispersed sol according to the first aspect, the mass ratio of the organosilicon compound to the modified anhydrous zinc antimonate colloidal particles (C) is 0.01 to 0.50 and the mass ratio of the amine compound to the modified anhydrous zinc antimonate colloidal particles (C) is 0.001 to 0.05.

As a third aspect, in the hydrophobic organic solvent-dispersed sol according to the first aspect or the second aspect, the organosilicon compound is at least one compound selected from a group consisting of an organosilicon compound of General Formula (I)

   (I)

(where each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group, or a cyano group and is bonded to the silicon atom through a Si—C bond, $R^2$ is a $C_{1-8}$ alkyl, alkoxyalkyl, or acyl group, each of a and b is an integer of 0, 1, or 2, and a+b is an integer of 0, 1, or 2) and/or General Formula (II)

   (II)

(where $R^4$ is a $C_{1-5}$ alkyl group, X is a $C_{1-4}$ alkyl or acyl group, Y is a $C_{1-20}$ alkylene group, and c is an integer of 0 or 1) and a hydrolysis product thereof.

As a fourth aspect, in the hydrophobic organic solvent-dispersed sol according to the first aspect or the second aspect, the amine compound is at least one compound selected from a group consisting of a primary amine, a secondary amine, and a tertiary amine.

As a fifth aspect, in the hydrophobic organic solvent-dispersed sol according to any one of the first aspect to the fourth aspect, the hydrophobic organic solvent is at least one compound selected from a group consisting of ketones, esters, hydrocarbons, halogenated hydrocarbons, and polyoxyalkylenedicarboxylic acid alkyl esters.

As a sixth aspect, in the hydrophobic organic solvent-dispersed sol according to any one of the first aspect to the fifth aspect, the hydrophobic organic solvent is at least one compound selected from a group consisting of 1-pentanol, methyl ethyl ketone, methyl isobutyl ketone, cyclohexanone, ethyl acetate, butyl acetate, methyl methacrylate, diisopropyl ether, toluene, triethylene glycol di-2-ethylhexanoate (3GO), triethylene glycol di-2-ethylbutyrate (3GH), tetraethylene glycol diheptanoate (4G7), and tetraethylene glycol di-2-ethylhexanoate (4GO).

As a seventh aspect, a method for producing the hydrophobic organic solvent-dispersed sol according to claim 1 or 2 includes
(a) obtaining a hydrophilic solvent-dispersed sol of modified anhydrous zinc antimonate colloidal particles (C), which includes: mixing a hydrophilic solvent-dispersed sol of anhydrous zinc antimonate colloidal particles (A) and a hydrophilic solvent-dispersed sol of at least one substance (B) of colloidal particles of a composite oxide containing silica and stannic oxide or silica and antimony pentoxide at a silica/stannic oxide or silica/antimony pentoxide mass ratio of 0.1 to 10, an oligomer of the colloidal particles, and a mixture of the colloidal particles and the oligomer at an (A)/(B) mass ratio of 2 to 50; and coating the anhydrous zinc antimonate colloidal particles (A) with at least one substance (B) of the colloidal particles of the composite oxide, the oligomer of the colloidal particles, and the mixture of the colloidal particles and the oligomer,
(b) cation-exchanging the hydrophilic solvent-dispersed sol of the modified anhydrous zinc antimonate colloidal particles (C) obtained in the (a),
(c) obtaining a hydrophilic solvent-dispersed sol containing surface-modified zinc antimonate colloidal particles formed by bonding an organosilicon compound and an amine compound to the surface of the modified anhydrous zinc antimonate colloidal particles (C), which includes adding at least one compound selected from a group consisting of an organosilicon compound of General Formula (I)

   (I)

(where each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group, or a cyano group and is bonded to the silicon atom through a Si—C bond, $R^2$ is a $C_{1-8}$ alkyl, alkoxyalkyl, or acyl group, each of a and b is an integer of 0, 1, or 2, and a+b is an integer of 0, 1, or 2) and/or General Formula (II)

   (II)

(where $R^4$ is a $C_{1-5}$ alkyl group, X is a $C_{1-4}$ alkyl or acyl group, Y is a $C_{1-20}$ alkylene group, and c is an integer of 0 or 1) and a hydrolysis product thereof to an acidic hydrophilic solvent-dispersed sol of the modified anhydrous zinc antimonate colloidal particles (C) obtained in the (b), and making a mass ratio of the organosilicon compound to the modified anhydrous zinc antimonate colloidal particles (C) of 0.01 to 0.50 and a mass ratio of the amine compound to the modified anhydrous zinc antimonate colloidal particles (C) of 0.001 to 0.05, and
(d) replacing a dispersion medium of the hydrophilic solvent-dispersed sol obtained in the
(c) with a hydrophobic organic solvent having a water solubility of 0.002 to 12% by mass.

As an eighth aspect, in the method for producing the hydrophobic organic solvent-dispersed sol according to the seventh aspect, the amine compound is at least one compound selected from a group consisting of a primary amine, a secondary amine, and a tertiary amine.

As a ninth aspect, in the method for producing the hydrophobic organic solvent-dispersed sol according to the seventh aspect or the eighth aspect, the hydrophobic organic solvent is at least one compound selected from a group consisting of ketones, esters, hydrocarbons, halogenated hydrocarbons, and polyoxyalkylenedicarboxylic acid alkyl esters.

As a tenth aspect, in the method for producing the hydrophobic organic solvent-dispersed sol according to any one of the seventh aspect to the ninth aspect, the hydrophobic organic solvent is at least one compound selected from a group consisting of 1-pentanol, methyl ethyl ketone, methyl isobutyl ketone, cyclohexanone, ethyl acetate, butyl acetate, methyl methacrylate, diisopropyl ether, toluene, triethylene glycol di-2-ethylhexanoate (3GO), triethylene glycol di-2-ethylbutyrate (3GH), tetraethylene glycol diheptanoate (4G7), and tetraethylene glycol di-2-ethylhexanoate (4GO).

As an eleventh aspect, the method for producing the hydrophobic organic solvent-dispersed sol according to the seventh aspect is characterized in that the hydrophilic solvent-dispersed sol of modified anhydrous zinc antimonate colloidal particles (C) that are formed by coating the anhydrous zinc antimonate colloidal particles (A) with at least one substance (B) of the colloidal particles of the composite oxide, the oligomer of the colloidal particles, and the mixture of the colloidal particles and the oligomer is made to have a pH of 6 to 11 in the (a).

Effects of the Invention

The sol in which surface-modified anhydrous zinc antimonate colloidal particles are dispersed in a hydrophobic organic solvent having a water solubility of 0.002 to 12% by mass of the present invention can be readily blended with various resins when a highly hydrophobic solvent such as methyl ethyl ketone is used as a dispersion medium, and thus can provide a with very highly transparency. Therefore, the sol is suitably used for a heat ray shielding layer and an ultraviolet absorbing layer for transparent films. Examples of the transparent film substrate include films of polyester, polyethylene, polypropylene, nylon, vinyl chloride, polycarbonate, polyvinyl alcohol, polymethyl methacrylate, polyethylene terephthalate (PET), triacetate cellulose (TAC), ethylene, vinyl alcohol resins, and the like.

Furthermore, the sol in which surface-modified anhydrous zinc antimonate colloidal particles are dispersed in a hydrophobic organic solvent having a water solubility of 0.002 to 12% by mass of the present invention can be used as a plasticizer for polyvinyl butyral that is used for an interlayer in laminated glass used for automobiles, rail cars, aircrafts, ships, buildings, and the like when a polyoxyalkylenedicarboxylic acid alkyl ester such as triethylene glycol di-2-ethylhexanoate (3GO) is used as a dispersion medium. Consequently, anhydrous zinc antimonate colloidal particles having heat ray shielding function or ultraviolet absorption function can be dispersed in the interlayer, and thus the heat ray shielding function or the ultraviolet absorption function of laminated glass can be improved without transparency loss.

BEST MODES FOR CARRYING OUT THE INVENTION

In the hydrophobic organic solvent-dispersed sol of the present invention, the anhydrous zinc antimonate colloidal particles (A) as cores of the surface-modified anhydrous zinc antimonate colloidal particles are anhydrous zinc antimonate having a $ZnO/Sb_2O_5$ molar ratio of 0.8 to 1.2 and have a primary particle diameter of 5 to 500 nm and preferably 5 to 50 nm, under transmission electron microscope observation.

Anhydrous zinc antimonate can be obtained using a known method. For example, anhydrous zinc antimonate obtained by the method according to Japanese Patent Application Publication No. JP-A-6-219743 is preferably used. Specifically, the method includes mixing a zinc compound and colloidal antimony oxide at a $ZnO/Sb_2O_5$ molar ratio of 0.8 to 1.2 and then calcining the mixture at 500 to 1100° C.

As the zinc compound, at least one zinc compound selected from a group consisting of zinc hydroxide, zinc oxide, inorganic acid salts of zinc, and organic acid salts of zinc can be used.

Examples of the inorganic acid salt of zinc include zinc carbonate, basic zinc carbonate, zinc nitrate, zinc chloride, and zinc sulfate.

Examples of the organic acid salt of zinc include zinc formate, zinc acetate, and zinc oxalate.

Commercially available industrial chemicals may be used as such zinc compounds. Zinc hydroxide or zinc oxide having a primary particle diameter of 500 nm or less can be used. In particular, salts having an acid that is volatilized by calcining, that is, carbonates and organic acid salts are preferable. They may be used alone or as a mixture of them.

The colloidal antimony oxide is antimony oxide having a primary particle diameter of 300 nm or less. Examples of the colloidal antimony oxide include an antimony pentoxide sol, a hexaantimony tridecaoxide sol, a hydrated antimony tetroxide sol, and colloidal antimony trioxide.

The antimony pentoxide sol can be produced by known methods, for example, a method of oxidizing antimony trioxide (Japanese Patent Application Publication No. JP-B-57-11848), a method of dealkalizing an alkali antimonate with ion exchange resin (U.S. Pat. No. 4,110,247 specification), and a method of acid-treating sodium antimonate (Japanese Patent Application Publication No. JP-A-60-41536, Japanese Patent Application Publication No. JP-A-62-182116).

The hexaantimony tridecaoxide sol can be produced by a method of oxidizing antimony trioxide (Japanese Patent Application Publication No. JP-A-62-125849), and the hydrated antimony tetroxide sol can also be produced by a method of oxidizing antimony trioxide (Japanese Patent Application Publication No. JP-A-52-21298).

The colloidal antimony trioxide can be produced by a gas phase method (Japanese Patent Application Publication No. JP-B-61-3292).

The antimony oxide sol has a primary particle diameter of 2 to 200 nm, preferably 2 to 40 nm, and in particular, an acidic sol without bases such as an amine and sodium is preferable. A usable antimony oxide sol has an antimony oxide ($Sb_2O_5$, $Sb_6O_{13}$, or $Sb_2O_4$) concentration of 1 to 60% by mass. Such antimony oxide sol may be dried by spray drying, vacuum drying, freeze drying, and the like to obtain a dried antimony oxide sol for use. As the colloidal antimony oxide, commercially available industrial chemicals of an antimony pentoxide sol, antimony pentoxide powder, or antimony trioxide ultrafine particle powder may be used.

The zinc compound and the antimony oxide sol can be mixed using an apparatus such as a Satake mixer, a Pfaudler mixer, and a disperser at a mixing temperature of 0 to 100° C. for a mixing time of 0.1 to 30 hours. The zinc compound and the dried antimony oxide sol or the colloidal antimony trioxide can be mixed using an apparatus such as a mortar, a V-mixer, Henschel-Mixer, and a ball mill.

In the present invention, the zinc compound is preferably mixed with the antimony oxide sol, its dried substance, or the colloidal antimony trioxide so as to have a $ZnO/Sb_2O_5$ molar ratio of 0.8 to 1.2.

In the present invention, a mixture (slurry) of the zinc compound and the antimony oxide sol can be dried with a spray dryer, a drum dryer, a hot-air tray dryer, a vacuum dryer, a freeze dryer, and the like at 500° C. or less. The slurry may be separated by suction filtration, centrifugal filtration, filter press, or the like, and as necessary, poured with water for washing to remove soluble impurities such as $SO_4$ derived from a raw material, to obtain a wet cake, and then the cake may be dried in the hot-air tray dryer and the like at room temperature to 500° C. The drying is preferably carried out at 300° C. or less in consideration of the apparatuses or operation.

In the present invention, a mixture of the zinc compound and the antimony oxide sol, its dried substance, or the colloidal antimony trioxide is calcined at 500 to 1100° C., preferably at 550 to 900° C., for 0.5 to 50 hours, preferably for 2 to 20 hours. The calcining produces a solid phase reaction to give anhydrous zinc antimonite.

The anhydrous zinc antimonate is turned into white to blue-green depending on the calcining condition and the like.

In the measurement result of X-ray diffraction on the anhydrous zinc antimonate obtained by the method, there are the same X-ray diffraction peaks as those of zinc antimonate described in ASTM (Index to the X-ray Powder Data File Inorganic) {$ZnSb_2O_6$ in ASTM No. 3-0455, $Zn(SbO_3)_2$ in ASTM No. 11-214} and no diffraction peaks corresponding to zinc oxide and anhydrous antimony pentoxide. Thus, the obtained anhydrous zinc antimonate has a $ZnSb_2O_6$ structure.

The zinc antimonate has a primary particle diameter of 5 to 500 nm under transmission electron microscope observation, which reveals colloidal particles. In particular, the zinc antimonate obtained at a calcining temperature of 500 to 680° C. shows a resistance value of 0.1 kΩ to 1 MΩ and has conductivity by electronic conduction.

The sol in which the anhydrous zinc antimonate colloidal particle (A) is dispersed in a hydrophilic solvent used in the method for producing the hydrophobic organic solvent-dispersed sol of the present invention can be obtained by wet milling of the anhydrous zinc antimonate in a hydrophilic solvent. Examples of the usable wet milling apparatus include a sand grinder, a ball mill, a homogenizer, a disperser, and a colloid mill.

In the present invention, the hydrophilic solvent means water and an organic solvent having a water content of more than 12% by mass in the organic phase among two phases that are formed by mixing the organic solvent with water at 20° C. Specific examples of the hydrophilic solvent include water, methanol, ethanol, propanol, butanol, ethylene glycol, N,N-dimethylacetamide, N-methylpyrrolidone, ethyl cellosolve, and propylene glycol monomethyl ether.

The sol in which the anhydrous zinc antimonate colloidal particle (A) is dispersed in a hydrophilic solvent used in the method for producing the hydrophobic organic solvent-dispersed sol of the present invention includes anhydrous zinc antimonate colloidal particles having a $ZnO/Sb_2O_5$ molar ratio of 0.8 to 1.2 and a primary particle diameter of 5 to 500 nm, preferably 5 to 50 nm, under transmission electron microscope observation. The hydrophilic solvent-dispersed sol has an anhydrous zinc antimonate concentration of 1 to 70% by mass, preferably 10 to 50% by mass. Furthermore, the hydrophilic solvent-dispersed sol has a pH of 4 to 11, preferably a pH of 6 to 8.

The pH of the hydrophilic solvent-dispersed sol can be measured as follows. In the case of an aqueous sol, a pH electrode is immersed in a sol itself to determine the pH with a pH meter. In the case of an organic solvent-dispersed sol, a pH electrode is immersed in a liquid in which the sol and water having the same mass as that of the sol are mixed, and the value shown by a pH meter is regarded as the pH of the organic solvent-dispersed sol.

In the present invention, at least one substance (B) of colloidal particles of a composite oxide containing silica and stannic oxide or silica and antimony pentoxide at a silica/stannic oxide or silica/antimony pentoxide mass ratio of 0.1 to 10, an oligomer of them, and a mixture of them, which coats an outer surface of the anhydrous zinc antimonate colloidal particles (A) as cores, has a primary particle diameter of 5 nm or less under transmission electron microscope observation. The colloidal particles of a composite oxide, the oligomer of them, and the mixtures of them can be obtained by a known method (for example, Japanese Patent Application Publication No. JP-B-50-40119) shown below. Namely, an aqueous alkali silicate solution or a silicic acid sol solution and an aqueous alkali stannate solution or an aqueous alkali antimonate solution are mixed, and then, the mixture is decationized with cation exchange resin to obtain the colloidal particles of a composite oxide.

As the aqueous alkali silicate solution, sodium silicate and potassium silicate can be used, and as the silicic acid sol solution, an activated silica obtained by cation-exchanging such aqueous alkali silicate solutions can be used. As the aqueous alkali stannate solution, an aqueous sodium stannate solution is preferably used. As the alkali antimonate, potassium antimonate is preferably used.

In the method for producing the hydrophobic organic solvent-dispersed sol of the present invention, at least one substance (B) of the colloidal particles of a composite oxide, the oligomer of them, and the mixture of them is used as a hydrophilic solvent-dispersed sol. An aqueous sol of at least one substance (B) of the colloidal particles of a composite oxide obtained by a known method (for example, Japanese Patent Application Publication No. JP-B-50-40119), the oligomer of them, and the mixture of them can be replaced with a hydrophilic solvent other than water by a known method such as distillation and ultrafiltration.

The hydrophilic solvent-dispersed sol of at least one substance (B) of the colloidal particles of a composite oxide, the oligomer of them, and the mixture of them may contain an alkaline component, for example, alkylamines such as n-propylamine, isopropylamine, and diisopropylamine, alkanolamines such as monoethanolamine, and alicyclic amines such as piperidine. They may be used alone or as a mixture of two or more of them.

The hydrophilic solvent-dispersed sol of at least one substance (B) of colloidal particles of a composite oxide, an oligomer of them, and a mixture of them used in the producing method of the present invention has a total concentration of silica and stannic oxide or silica and antimony pentoxide of 0.1 to 30% by mass and preferably 1 to 10% by mass. The hydrophilic solvent-dispersed sol has a pH of 1 to 10, preferably a pH of 5 to 8.

As the organosilicon compound used in the present invention, at least one compound selected from a group consisting of an organosilicon compound of General Formula (I)

$$(R^1)_a(R^3)_b Si(OR^2)_{4-(a+b)} \quad (I)$$

(where each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group, or a cyano group and is bonded to the silicon atom through a Si—C bond, $R^2$ is a $C_{1-8}$ alkyl, alkoxyalkyl, or acyl group, each of a and b is an integer of 0, 1, or 2, and a+b is an integer of 0, 1, or 2) and/or General Formula (II)

$$[(R^4)_c Si(OX)_{3-c}]_2 Y \quad (II)$$

(where $R^4$ is a $C_{1-5}$ alkyl group, X is a $C_{1-4}$ alkyl or acyl group, Y is a $C_{1-20}$ alkylene group, and c is an integer of 0 or 1) and its hydrolysis product can be used.

In the organosilicon compound of General Formula (I)

$$(R^1)_a(R^3)_b Si(OR^2)_{4-(a+b)} \quad (I)$$

$R^1$ and $R^3$ may be the same organic group or different organic groups, and a and b may be the same integer or different integers.

Examples of the organosilicon compound of General Formula (I) include tetramethoxysilane, tetraethoxysilane, tetra-n-propoxysilane, tetraisopropoxysilane, tetra-n-butoxysilane, tetraacetoxysilane, methyltrimethoxysilane, methyltriethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexepthyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)-γ-aminopropyltrimethoxysilane, N-(β-aminoethyl)-γ-aminopropylmethyldimethoxysilane, γ-aminopropylmethyldimethoxysilane, N-(β-aminoethyl)-γ-aminopropyltriethoxysilane, N-(β-aminoethyl)-γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptomethyldiethoxysilane, methylvinyldimethoxysilane, and methylvinyldiethoxysilane. They can be used alone or as a mixture of two or more of them.

The hydrolysis product of an organosilicon compound of General Formula (I) is a compound of General Formula (I) where some of or all of $R^2$s are substituted with hydrogen atoms. Such hydrolysis products of an organosilicon compound of General Formula (I) can be used alone or as a mixture of two or more of them. Hydrolysis of the organosilicon compound is carried out by adding water or, if desired, an acidic aqueous solution such as an aqueous hydrochloric acid solution, an aqueous sulfuric acid solution, or an aqueous acetic acid solution into the organosilicon compound and stirring.

Examples of the organosilicon compound used in the present invention of General Formula (II)

$$[(R^4)_c Si(OX)_{3-c}]_2 Y \qquad (II)$$

include methylenebismethyldimethoxysilane, ethylenebisethyldimethoxysilane, propylenebisethyldiethoxysilane, butylenebismethyldiethoxysilane, and hexamethyldisilazane. They can be used alone or as a mixture of two or more of them.

The hydrolysis product of an organosilicon compound of General Formula (II) is a compound of General Formula (II) where some of or all of Xs are substituted with hydrogen atoms. Such hydrolysis products of an organosilicon compound of General Formula (II) can be used alone or as a mixture of two or more of them. Hydrolysis of the organosilicon compound is carried out by adding water or, if desired, an acidic aqueous solution such as an aqueous hydrochloric acid solution, an aqueous sulfuric acid solution, or an aqueous acetic acid solution into the organosilicon compound and stirring.

The organosilicon compound used in the present invention is preferably at least one compound selected from a group consisting of a organosilicon compound of General Formula (I) and its hydrolysis product. Specifically preferred are methyltrimethoxysilane, phenyltrimethoxysilane, methyltriethoxysilane, methyltributoxysilane, and hydrolysis products of them.

The amine compound used in the present invention is at least one compound selected from a group consisting of a primary amine, a secondary amine, and a tertiary amine.

Examples of the primary amine include methylamine, ethylamine, propylamine, isopropylamine, butylamine, isobutylamine, amylamine, allylamine, hexylamine, heptylamine, octylamine, nonylamine, decylamine, dodecylamine, cyclopropylamine, cyclobutylamine, cyclopentylamine, and cyclohexylamine.

Examples of the secondary amine include dimethylamine, diethylamine, dipropylamine, diisopropylamine, dibutylamine, diisobutylamine, N-ethyl-1,2-dimethylpropylamine, diamylamine, and diallylamine.

Examples of the tertiary amine include trimethylamine, triethylamine, tripropylamine, tributylamine, triamylamine, and triallylamine.

In the present invention, the hydrophobic organic solvent having a water solubility of 0.002 to 12% by mass means a solvent that is not homogeneously mixed with water and has a water content rate of 0.002 to 12% by mass in the organic phase among two phases that are formed by mixing the solvent with water at 20° C.

Examples of the hydrophobic organic solvent include 1-pentanol (a water solubility of 6.8% by mass), methyl ethyl ketone (9.9% by mass), methyl isobutyl ketone (1.8% by mass), cyclohexanone (8% by mass), ethyl acetate (2.9% by mass), butyl acetate (1.9% by mass), methyl methacrylate (1.1% by mass), diisopropyl ether (0.55% by mass), dibutyl ether (0.2% by mass), toluene (0.05% by mass), triethylene glycol di-2-ethylhexanoate (3GO) (0.0025% by mass), triethylene glycol di-2-ethylbutyrate (3GH) (0.0054% by mass), tetraethylene glycol diheptanoate (4G7) (0.0079% by mass), and tetraethylene glycol di-2-ethylhexanoate (4GO) (0.038% by mass).

The method for producing the hydrophobic organic solvent-dispersed sol of anhydrous zinc antimonate colloidal particles, wherein surface-modified anhydrous zinc antimonate colloidal particles are dispersed in a hydrophobic organic solvent having a water solubility of 0.002 to 12% by mass, the surface-modified anhydrous zinc antimonate colloidal particles being formed by coating outer surfaces of anhydrous zinc antimonate colloidal particles (A) serving as cores with at least one substance (B) of colloidal particles of a composite oxide containing silica and stannic oxide or silica and antimony pentoxide at a silica/stannic oxide or silica/antimony pentoxide mass ratio of 0.1 to 10, an oligomer of the colloidal particles, and a mixture of the colloidal particles and the oligomer to form modified anhydrous zinc antimonate colloidal particles (C), and by bonding an organosilicon compound and an amine compound to surfaces of the colloidal particles (C), includes the following step (a) to step (d).

The step (a) is a step for obtaining a hydrophilic solvent-dispersed sol of modified anhydrous zinc antimonate colloidal particles (C). In the step (a), a hydrophilic solvent-dispersed sol of anhydrous zinc antimonate colloidal particles (A) is mixed with a hydrophilic solvent-dispersed sol of at least one substance (B) of colloidal particles of a composite oxide containing silica and stannic oxide or silica and antimony pentoxide at a silica/stannic oxide or silica/antimony pentoxide mass ratio of 0.1 to 10, an oligomer of them, and a mixture of them so as to have an (A)/(B) mass ratio of 2 to 50. The mixing is preferably carried out using a strong stirring apparatus such as a disperser for thoroughly stirring so as to homogeneously mix the both, and the stirring is preferably carried out for about 1 to 5 hours. Furthermore, the mixing is preferably carried out in a range of pH 6 to 11 and more preferably in a pH range of 8 to 10. By the mixing, the surface of the anhydrous zinc antimonate colloidal particles (A) is evenly coated with at least one substance (B) of colloidal particles of a composite oxide containing silica and stannic oxide or silica and antimony pentoxide at a silica/stannic oxide or silica/antimony pentoxide mass ratio of 0.1 to 10, an oligomer of them, and a mixture of them. By the step (a), the hydrophilic solvent-dispersed sol of modified anhydrous zinc antimonate colloidal particles (C) in which the anhydrous zinc antimonate colloidal particles (A) are coated with at least one substance (B) of colloidal particles of a composite oxide containing silica and stannic oxide or silica and antimony pentoxide at a silica/stannic oxide or silica/antimony pentoxide mass ratio of 0.1 to 10, an oligomer of them, and a mixture of them can be obtained. The hydrophilic solvent-dispersed sol of modified anhydrous zinc antimonate colloidal particles (C) obtained by the step (a) has a total concentration of metal oxides that is the sum of anhydrous zinc antimonate as the core and silica and stannic oxide or silica and antimony pentoxide as its coating of 5 to 30% by mass. The sol has a pH range of 6 to 11 and more preferably a pH range of 8 to 10.

The step (b) is a step for cation-exchanging the hydrophilic solvent-dispersed sol of modified anhydrous zinc antimonate colloidal particles (C) obtained in the step (a). In the step (b), the hydrophilic solvent-dispersed sol of modified anhydrous zinc antimonate colloidal particles (C) is cation-exchanged to obtain an acidic hydrophilic solvent-dispersed sol of modified anhydrous zinc antimonate colloidal particles (C). The cation-exchange can be carried out by passing the hydrophilic solvent-dispersed sol of modified anhydrous zinc antimonate colloidal particles (C) through a column packed with hydrogen form cation exchange resin. The obtained acidic hydrophilic solvent-dispersed sol of modified anhydrous zinc antimonate colloidal particles (C) has a pH range of 1 to 3.

The step (c) is a step for obtaining a hydrophilic solvent-dispersed sol containing surface-modified zinc antimonate colloidal particles that are formed by bonding an organosilicon compound and an amine compound to a surface of the modified anhydrous zinc antimonate colloidal particles (C). In the step (c), to the acidic hydrophilic solvent-dispersed sol of modified anhydrous zinc antimonate colloidal particles (C) obtained in the step (b), at least one compound selected from a group consisting of an organosilicon compound of General Formula (I)

(where each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group, or a cyano group and is bonded to the silicon atom through a Si—C bond, $R^2$ is a $C_{1-8}$ alkyl, alkoxyalkyl, or acyl group, each of a and b is an integer of 0, 1, or 2, and a+b is an integer of 0, 1, or 2) and/or General Formula (II)

(where $R^4$ is a $C_{1-5}$ alkyl group, X is a $C_{1-4}$ alkyl or acyl group, Y is a $C_{1-20}$ alkylene group, and c is an integer of 0 or 1) and its hydrolysis product is added to make a mass ratio of the organosilicon compound to the modified anhydrous zinc antimonate colloidal particles (C) of 0.01 to 0.50 and a mass ratio of the amine compound to the modified anhydrous zinc antimonate colloidal particles (C) of 0.001 to 0.05.

The addition order of the organosilicon compound and the amine compound to the acidic hydrophilic solvent-dispersed sol of modified anhydrous zinc antimonate colloidal particles (C) is optional, and the both may be added at the same time. The temperature of the acidic hydrophilic solvent-dispersed sol of modified anhydrous zinc antimonate colloidal particles (C) is not specifically limited when the organosilicon compound and the amine compound are added but is preferably from room temperature to less than the boiling point of an hydrophilic solvent. The organosilicon compound and the amine compound are preferably added with thoroughly stirring, and the stirring is preferably carried out for about 1 to 5 hours. By the step (c), the surface of the modified anhydrous zinc antimonate colloidal particles (C) is bonded with the organosilicon compound and the amine compound. The sol obtained by the step (c) has a pH range of 2 to 5 and preferably a pH range of 3 to 4.

In the step (d), the dispersion medium in the hydrophilic solvent-dispersed sol obtained in the step (c) is replaced with a hydrophobic organic solvent having a water solubility of 0.002 to 12% by mass. The solvent replacement can be carried out using a known method such as distillation and ultrafiltration. For efficient solvent replacement, the hydrophilic solvent-dispersed sol obtained in the step (c) is preferably previously concentrated so as to have a concentration of the modified anhydrous zinc antimonate colloidal particles (C) in a range of 1 to 70% by mass and to preferably have a concentration in a range of 10 to 50% by mass. The sol concentration can be carried out using a known method such as evaporation by heating and ultrafiltration. The temperature of the sol during solvent replacement is in a range from room temperature to the boiling point of a hydrophilic solvent or a hydrophobic organic solvent having a water solubility of 0.002 to 12% by mass. The solvent replacement is carried out until the hydrophilic solvent concentration reaches less than 1% by mass in the sol. The sol obtained in the step (d) has a total concentration of metal oxides that is the sum of anhydrous zinc antimonate as the core and silica and stannic oxide or silica and antimony pentoxide as its coating of 20 to 70% by mass.

EXAMPLES

Hereinafter, examples of the present invention will be described. The invention is not limited to the examples. Measurement methods of physical properties will be described below.
[Water Content]
Water content was determined by a Karl Fischer titration method.
[Particle Diameter Measured By Dynamic Light Scattering]
A sol was diluted with a dispersion solvent, and the particle diameter was measured using solvent parameters with a dynamic light scattering apparatus: Coulter N4 PLUS (trade name: manufactured by Coulter USA).
[Specific Gravity]
Specific gravity was determined by a hydrometer method.
[Viscosity]
Viscosity was determined with an Ostwald viscometer (20° C.).

Preparation Example 1

In 1185 kg of water, 100 kg of antimony trioxide (manufactured by Mikuni Smelting & Refining Co., Ltd.) and 2086 g of zinc oxide (second grade, manufactured by Sakai Chemical Industry Co., Ltd.) were dispersed, and then 165.6 kg of 35% by mass of aqueous hydrogen peroxide was added. The whole was reacted at 90 to 100° C. for 2 hours. Then, the mixture was concentrated with an ultrafiltration apparatus to obtain 764 kg of a ZnO containing antimony pentoxide sol having a $ZnO/Sb_2O_5$ molar ratio of 0.075. The obtained sol had a specific gravity of 1.252 and an $Sb_2O_5$ content of 14.39% by mass. With pure water, 764 kg of the obtained ZnO containing antimony pentoxide sol was diluted to an $Sb_2O_5$ content of 14.0% by mass, then 33.8 kg of 35% by mass of aqueous hydrogen peroxide was added, and then 35.0 kg of basic zinc carbonate (manufactured by Sakai Chemical Industry Co., Ltd., $3ZnCO_3.4Zn(OH)_2$, a content of 72.5% by mass calculated as ZnO) was added. The whole was stirred for 6 hours to obtain a slurry. The slurry had a ZnO content of 3.2% by mass, an $Sb_2O_5$ content of 12.9% by mass, and a $ZnO/Sb_2O_5$ molar ratio of 0.985. The slurry was dried with a spray dryer to obtain 136.5 kg of dry powder. Into a fluidized bed, 136.5 kg of the obtained dry powder was placed. Into the fluidized bed, a mixed gas having a partial pressure ratio of water vapor/nitrogen gas of 1.5, which was obtained by bubbling nitrogen gas at 24 m$^3$/hr in a hot bath at 85° C., was introduced, and the dry powder was calcined at 480° C. for 4 hours. The obtained powder was dark blue and had a specific surface area of 60.5 m$^2$/g determined based on the BET method. Furthermore, the powder had the same peaks as those of anhydrous zinc antimonate ($ZnSb_2O_6$) from the measurement result of X-ray diffraction. A tablet obtained by press-molding the powder at 300 kg/cm$^2$ showed electric conductivity having a specific resistance value of 74 Ω·cm. The powder was pulverized with a pin disk mill to obtain 123.4 kg of pulverized powder. Into a wet milling equipment (Star Mill®) LME 20, manufactured by Ashizawa Finetech Ltd.), 84 kg of the obtained pulverized powder and 316 kg of pure water were placed, and wet milling was carried out with glass beads (0.3φ) at a peripheral speed of 10 m/s for 20 hours. The sol obtained by the wet milling was separated from the glass beads using 200 kg of pure water, then brought into contact with a cation exchange resin (Amberlite®) IR-120B, manufactured by Organo Corporation) and an anion exchange resin (Amberlite®) IR-410, manufactured by Organo Corporation) in this order to remove impurity ions such as a sulfate ion derived from raw materials. Then, to the sol from which the impurity ions were removed, 420 g of diisopropylamine was added, and the sol was concentrated using an ultrafiltration apparatus to obtain 244.5 kg of an aqueous sol of anhydrous zinc antimonate colloidal particles. The obtained aqueous sol of anhydrous zinc antimonate colloidal particles was transparent dark blue and had a $ZnSb_2O_6$ concentration of 33.7% by mass, a pH of 6.62, a specific gravity of 1.390, and an electric conductivity of 375 μS/cm. The aqueous sol was stable even after standing at 50° C. for one month. The aqueous sol had a primary particle diameter of 10 to 20 nm under transmission electron microscope observation and a particle diameter of 89 nm as measured by a dynamic light scattering method. The dried aqueous sol had a specific surface area of 64.5 m$^2$/g based on the BET method and a particle diameter of 15.0 nm calculated from the specific surface area.

Preparation Example 2

Into 200 g of pure water, 18 g of JIS No. 3 sodium silicate (a $SiO_2$ content of 29.8% by mass, manufactured by Fuji Kagaku Corp.) was dissolved, and then 4.9 g of sodium stannate $NaSnO_3.H_2O$ (a $SnO_2$ content of 55.1% by mass, manufactured by Showa Kako Corporation) was dissolved. The obtained aqueous solution was passed through a column packed with a hydrogen form cation exchange resin (Amberlite IR-120B) to obtain 620 g of an acidic aqueous sol of stannic oxide-silica composite colloidal particles and an oligomer of them (pH 2.4, a $SnO_2$ content of 0.44% by mass, a $SiO_2$ content of 0.87% by mass, a $SiO_2/SnO_2$ mass ratio of 2.0). Subsequently, to the obtained sol, 1.6 g of diisopropylamine was added. The obtained sol was an alkaline aqueous sol of stannic oxide-silica composite colloidal particles and an oligomer of them and had a pH of 8.0. In the aqueous sol, colloidal particles having a primary particle diameter of 5 nm or less were observed under a transmission electron microscope.

Preparation Example 3

With 330.0 kg of pure water, 35.6 kg of an aqueous potassium silicate solution (a $SiO_2$ content of 19.9% by mass, manufactured by Nissan Chemical Industries, Ltd.) was diluted, and then 18.1 kg of a 48% potassium hydroxide aqueous solution and 3.2 kg of antimony trioxide (manufactured by Mikuni Smelting & Refining Co., Ltd.) were added. To the mixture, 2.2 kg of 35% by mass of aqueous hydrogen peroxide was added with stirring, and the whole was reacted at 93° C. for 1 hour to obtain an aqueous solution of potassium silicate antimonate. With 1 kg of pure water, 427.5 g of the obtained potassium silicate antimonate aqueous solution was diluted, and passed through a column packed with a hydrogen form cation exchange resin (Amberlite IR-120B) to obtain 2703 g of an aqueous sol of antimony pentoxide-silica composite colloidal particles and an oligomer of them (pH 2.1, an $Sb_2O_5$ content of 0.64% by mass, a $SiO_2$ content of 1.26% by mass, a $SiO_2/Sb_2O_5$ mass ratio of 2.0). Subsequently, to the obtained aqueous sol, 10.2 g of diisopropylamine was added.

The obtained sol was an alkaline aqueous sol of antimony pentoxide-silica composite colloidal particles and an oligomer of them and had a pH of 8.2. In the aqueous sol, colloidal particles having a primary particle diameter of 5 nm or less were observed under a transmission electron microscope.

Preparation Example 4

Into 274 g of pure water, 21.5 g of JIS No. 3 sodium silicate (a $SiO_2$ content of 29.8% by mass, manufactured by Fuji Kagaku Corp.) was dissolved, and then 2.9 g of sodium stannate $NaSnO_3·H_2O$ (a $SnO_2$ content of 55.7% by mass, manufactured by Showa Kako Corporation) was dissolved. The obtained aqueous solution was passed through a column packed with a hydrogen form cation exchange resin (Amberlite IR-120B) to obtain 640 g of an acidic aqueous sol of stannic oxide-silica composite colloidal particles and an oligomer of them (pH 2.7, a $SnO_2$ content of 1.00% by mass, a $SiO_2$ content of 0.25% by mass, a $SiO_2/SnO_2$ mass ratio of 4.0). Subsequently, to the obtained sol, 0.8 g of diisopropylamine was added. The obtained sol was an alkaline aqueous sol of stannic oxide-silica composite colloidal particles and an oligomer of them and had a pH of 6.3. In the aqueous sol, colloidal particles having a primary particle diameter of 5 nm or less were observed under a transmission electron microscope.

Preparation Example 5

Into 270 g of pure water, 23.9 g of JIS No. 3 sodium silicate (a $SiO_2$ content of 29.8% by mass, manufactured by Fuji Kagaku Corp.) was dissolved, and then 1.6 g of sodium stannate $NaSnO_3·H_2O$ (a $SnO_2$ content of 55.4% by mass, manufactured by Showa Kako Corporation) was dissolved. The obtained aqueous solution was passed through a column packed with a hydrogen form cation exchange resin (Amberlite IR-120B) to obtain 640 g of an acidic aqueous sol of stannic oxide-silica composite colloidal particles and an oligomer of them (pH 2.7, a $SnO_2$ content of 1.11% by mass, a $SiO_2$ content of 0.14% by mass, a $SiO_2/SnO_2$ mass ratio of 8.0). Subsequently, to the obtained sol, 0.8 g of diisopropylamine was added. The obtained sol was an alkaline aqueous sol of stannic oxide-silica composite colloidal particles and an oligomer of them and had a pH of 6.9. In the aqueous sol, colloidal particles having a primary particle diameter of 5 nm or less were observed under a transmission electron microscope.

Example 1

To 148 g of the aqueous sol of anhydrous zinc antimonate colloidal particles prepared in Preparation Example 1 (an anhydrous zinc antimonate content of 50 g), 382 g of the alkaline aqueous sol of stannic oxide-silica colloidal particles and an oligomer of them prepared in Preparation Example 2 was added, and the whole was thoroughly stirred. Subsequently, the mixed sol was heated and aged at 95° C. for 2 hours to obtain 530 g of an aqueous sol of modified anhydrous zinc antimonate colloidal particles coated with the stannic oxide-silica composite colloidal particles and the oligomer of them. The obtained sol had a pH of 7.7 and a total metal oxide concentration of 10.4% by mass. The obtained aqueous sol of modified anhydrous zinc antimonate colloidal particles was passed through a column packed with a hydrogen form cation exchange resin (Amberlite IR-120B), and the aqueous sol was recovered using pure water to obtain 1618 g of an acidic aqueous sol of modified anhydrous zinc antimonate colloidal particles. The obtained sol had a pH of 2.8 and a total metal oxide concentration of 3.4% by mass. To the obtained sol, 0.4 g of diisobutylamine was added to bond diisobutylamine to a surface of the modified anhydrous zinc antimonate colloidal particles. At this time, the sol had a pH of 4.0. Subsequently, the obtained sol was concentrated using an ultrafiltration apparatus to a total metal oxide concentration of 30.5% by mass. The sol after concentration had a specific gravity of 1.316, a viscosity of 1.7 mPa·s, and a pH of 3.4. The concentrated aqueous sol was poured into an evaporator with a recovery flask, and water was removed by evaporation at 70 Torr while adding methanol to the sol to obtain a methanol sol of modified anhydrous zinc antimonate colloidal particles bonded with diisobutylamine. The obtained methanol sol had a specific gravity of 0.968, a viscosity of 1.0 mPa·s, a pH of 4.5 (diluted with the same mass of water as that of the sol), a total metal oxide concentration of 21.2% by mass, and a water content of 0.46%. To the obtained methanol sol, 5.5 g of methyltrimethoxysilane (manufactured by Shin-Etsu Chemical Co., Ltd., trade name LS-530) was added, and the whole was refluxed under heat for 1 hour for silylation to bond a methyldimethoxysilyl group to the surface of the modified anhydrous zinc antimonate colloidal particles. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a methyldimethoxysilyl group was obtained. The obtained sol had a specific gravity of 1.400, a viscosity of 1.3 mPa·s, a total metal oxide concentration of 50.5% by mass, a primary particle diameter of 10 to 25 nm under transmission electron microscope observation, and a particle diameter of 85 nm as measured by a dynamic light scattering method.

Example 2

To 505 g of the aqueous sol of anhydrous zinc antimonate colloidal particles prepared in Preparation Example 1 (an anhydrous zinc antimonate content of 160 g), 1251 g of the alkaline aqueous sol of stannic oxide-silica composite colloidal particles and an oligomer of them prepared in Preparation Example 2 was added, and the whole was stirred for 1 hour. Subsequently, the mixed sol was heated and aged at 95° C. for 2 hours to obtain an aqueous sol of modified anhydrous zinc antimonate colloidal particles coated with the stannic oxide-silica composite colloidal particles and the oligomer of them. The obtained sol had a pH of 7.7 and a total metal oxide concentration of 9.7% by mass. Through a column packed with a hydrogen form cation exchange resin (Amberlite IR-120B), 906 g of the obtained aqueous sol of modified anhydrous zinc antimonate colloidal particles was passed to obtain 951 g of an acidic aqueous sol of modified anhydrous zinc antimonate colloidal particles. The obtained sol had a pH of 2.4 and a total metal oxide concentration of 9.5% by mass. To 463 g of the obtained acidic aqueous sol of modified anhydrous zinc antimonate colloidal particles, 0.18 g of diisobutylamine was added to bond diisobutylamine to a surface of the modified anhydrous zinc antimonate colloidal particles. At this time, the sol had a pH of 3.8. Subsequently, the obtained sol was poured into an evaporator with a recovery flask, and water was removed by evaporation at 600 Torr while adding methanol to the sol to obtain a methanol sol of modified anhydrous zinc antimonate colloidal particles. The obtained methanol sol had a specific gravity of 1.024, a viscosity of 1.0 mPa·s, a pH of 4.1 (diluted with the same mass of water as that of the sol), a total metal oxide concentration of 22.4% by mass, and a water content of 1.1% by mass. To the obtained methanol sol, 2.2 g of methyltrimethoxysilane (manufactured by Shin-Etsu Chemical Co., Ltd., trade name LS-530) was added, and the whole was refluxed under heat at 60° C. for 2 hours to bond a methyldimethoxysilyl group to the surface of the modified anhydrous zinc antimonate colloidal particles. Subsequently, methanol was removed by evaporation using the evaporator under a pressure of 80 Torr while adding methyl ethyl ketone to replace methanol with methyl ethyl ketone, and thus a methyl ethyl ketone sol of modified anhydrous zinc antimonate colloidal particles having the surface bonded with diisobutylamine and a methyldimethoxysilyl group was obtained. The obtained methyl ethyl ketone sol had a specific gravity of 1.118, a viscosity of 1.0 mPa·s, a total metal oxide concentration of 29.8% by mass, a primary particle diameter of 10 to 25 nm under transmission electron microscope observation, and a particle diameter of 90 nm as measured by a dynamic light scattering method.

Example 3

To 145 g of the aqueous sol of anhydrous zinc antimonate colloidal particles prepared in Preparation Example 1 (an anhydrous zinc antimonate content of 49 g), 374 g of the alkaline aqueous sol of stannic oxide-silica composite colloidal particles and an oligomer of them prepared in Preparation Example 2 was added, and the whole was thoroughly stirred. Subsequently, the mixed sol was heated and aged at 95° C. for 2 hours to obtain an aqueous sol of modified anhydrous zinc antimonate colloidal particles coated with the stannic oxide-silica composite colloidal particles. The obtained sol had a pH of 7.5 and a total metal oxide concentration of 10.4% by mass. The obtained aqueous sol of modified anhydrous zinc antimonate colloidal particles was passed through a column packed with a hydrogen form cation exchange resin (Amberlite IR-120B) to obtain 533 g of an acidic aqueous sol of modified anhydrous zinc antimonate colloidal particles. The obtained sol had a pH of 3.1 and a total metal oxide concentration of 10.1% by mass. To the obtained aqueous sol, 0.2 g of diisobutylamine was added to bond diisobutylamine to a surface of the modified anhydrous zinc antimonate colloidal particles. At this time, the sol had a pH of 3.8. To the aqueous sol, the same mass of methanol as that of water in the sol was added, and 2.7 g of phenyltrimethoxysilane (manufactured by Momentive, TSL 8173) was further added. Then, the whole was refluxed under heat for 1 hour to bond a phenyldimethoxysilyl group to the surface of the modified anhydrous zinc antimonate colloidal particles. To the obtained water-methanol mixed solvent sol, 0.2 g of diisobutylamine was further added. The whole was poured into an evaporator with a recovery flask, and water was removed by evaporation at 600 Torr while adding methanol to the sol to obtain a methanol sol of modified anhydrous zinc antimonate colloidal particles having the surface bonded with diisobutylamine and a phenyldimethoxysilyl group. The obtained methanol sol had a specific gravity of 0.966, a viscosity of 1.0 mPa·s, a pH of 4.3 (diluted with the same mass of water as that of the sol), a total metal oxide concentration of 20.6% by mass, and a water content of 1.64%. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a phenyldimethoxysilyl group was obtained. The obtained sol had a specific gravity of 1.250, a viscosity of 1.0 mPa·s, a total metal oxide concentration of 40.4% by mass, a primary particle diameter of 10 to 25 nm under transmission electron microscope observation, and a particle diameter of 78 nm as measured by a dynamic light scattering method.

Example 4

To 145 g of the aqueous sol of anhydrous zinc antimonate colloidal particles prepared in Preparation Example 1 (an anhydrous zinc antimonate content of 49 g), 374 g of the alkaline aqueous sol of stannic oxide-silica composite colloidal particles and an oligomer of them prepared in Preparation Example 2 was added, and the whole was thoroughly stirred. Subsequently, the mixed sol was heated and aged at 95° C. for 2 hours to obtain an aqueous sol of modified anhydrous zinc antimonate colloidal particles coated with the stannic oxide-silica composite colloidal particles and the oligomer of them. The obtained sol had a pH of 7.5 and a total metal oxide concentration of 10.4% by mass. The obtained aqueous sol of modified anhydrous zinc antimonate colloidal particles was passed through a column packed with a hydrogen form cation exchange resin (Amberlite IR-120B) to obtain 533 g of an acidic aqueous sol of modified anhydrous zinc antimonate colloidal particles. The obtained sol had a pH of 3.1 and a total metal oxide concentration of 10.1% by mass. To the obtained sol, 0.2 g of diisobutylamine was added to bond diisobutylamine to a surface of the modified anhydrous zinc antimonate colloidal particles. At this time, the sol had a pH of 3.8. To the aqueous sol, the same mass of methanol as that of water in the sol was added, and 2.7 g of phenyltrimethoxysilane (manufactured by Momentive, TSL 8173) was further added. Then, the whole was refluxed under heat for 1 hour to bond a phenyldimethoxysilyl group to the surface of the modified anhydrous zinc antimonate colloidal particles. To the obtained water-methanol mixed sol, 0.2 g of diisobutylamine was further added. The whole was poured into an evaporator with a recovery flask, and water was removed by evaporation at 600 Torr while adding methanol to the sol to obtain a methanol sol of modified anhydrous zinc antimonate colloidal particles having the surface bonded with diisobutylamine and a phenyldimethoxysilyl group. The obtained methanol sol had a specific gravity of 0.968, a viscosity of 1.0 mPa·s, a pH of 4.4 (diluted with the same mass of water as that of the sol), a total metal oxide concentration of 20.7% by mass, and a water content of 0.96%. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a phenyldimethoxysilyl group was obtained. The obtained sol had a specific gravity of 1.250, a viscosity of 1.1 mPa·s, a total metal oxide concentration of 40.5% by mass, a primary particle diameter of 10 to 25 nm under transmission electron microscope observation, and a particle diameter of 81 nm as measured by a dynamic light scattering method.

Example 5

To 107 g of the aqueous sol of anhydrous zinc antimonate colloidal particles prepared in Preparation Example 1 (an anhydrous zinc antimonate content of 36 g), 189 g of the alkaline aqueous sol of antimony pentoxide-silica composite colloidal particles and an oligomer of them prepared in Preparation Example 3 was added, and the whole was thoroughly stirred. Subsequently, the mixed sol was heated and aged at 95° C. for 2 hours to obtain an aqueous sol of modified anhydrous zinc antimonate colloidal particles coated with the antimony pentoxide-silica composite colloidal particles and the oligomer of them. The obtained sol had a pH of 7.5 and a total metal oxide concentration of 10.4% by mass. The obtained aqueous sol was passed through a column packed with a hydrogen form cation exchange resin (Amberlite IR-120B) to obtain 500 g of an acidic aqueous sol of modified anhydrous zinc antimonate colloidal particles coated with antimony pentoxide-silica composite colloidal particles. The obtained sol had a pH of 2.4 and a total metal oxide concentration of 7.9% by mass. To the obtained sol, 0.4 g of diisobutylamine was added to bond diisobutylamine to a surface of the modified anhydrous zinc antimonate colloidal particles. At this time, the sol had a pH of 3.0. To the aqueous sol, the same mass of methanol as that of water in the sol was added, and 4.0 g of methyltrimethoxysilane (manufactured by Shin-Etsu Chemical Co., Ltd., trade name LS-530) was further added. Then, the whole was refluxed under heat for 1 hour to bond a methyldimethoxy group to the surface of the modified anhydrous zinc antimonate colloidal particles. The obtained water-methanol mixed sol was poured into an evaporator with a recovery flask, and water was removed by evaporation at 600 Torr while adding methanol to the sol to obtain a methanol sol of modified anhydrous zinc antimonate colloidal particles having the surface bonded with diisobutylamine and a methyldimethoxysilyl group. The obtained methanol sol had a specific gravity of 0.964, a viscosity of 1.0 mPa·s, a pH of 4.3 (diluted with the same mass of water as that of the sol), a total metal oxide concentration of 20.5% by mass, and a water content of 2.54%. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a methyldimethoxysilyl group was obtained. The obtained sol had a specific gravity of 1.240, a viscosity of 1.1 mPa·s, a total metal oxide concentration of 40.1% by mass, a primary particle diameter of 10 to 25 nm under transmission electron microscope observation, and a particle diameter of 103 nm as measured by a dynamic light scattering method.

Example 6

To 107 g of the aqueous sol of anhydrous zinc antimonate colloidal particles prepared in Preparation Example 1 (an anhydrous zinc antimonate content of 36 g), 189 g of the alkaline aqueous sol of antimony pentoxide-silica composite colloidal particles and an oligomer of them prepared in Preparation Example 3 was added, and the whole was thoroughly stirred. Subsequently, the mixed sol was heated and aged at 95° C. for 2 hours to obtain an aqueous sol of modified anhydrous zinc antimonate colloidal particles coated with the antimony pentoxide-silica composite colloidal particles. The obtained sol had a pH of 7.5 and a total metal oxide concentration of 10.4% by mass. The obtained aqueous sol of modified anhydrous zinc antimonate colloidal particles was passed through a column packed with a hydrogen form cation exchange resin (Amberlite IR-120B) to obtain 500 g of an acidic aqueous sol of modified anhydrous zinc antimonate colloidal particles coated with antimony pentoxide-silica composite colloidal particles and an oligomer of them. The obtained sol had a pH of 2.4 and a total metal oxide concentration of 7.9% by mass. To the obtained sol, 0.4 g of diisobutylamine was added to bond diisobutylamine to a surface of the modified anhydrous zinc antimonate colloidal particles. At this time, the sol had a pH of 3.0. To the aqueous sol, the same mass of methanol as that of water in the sol was added, and 2.0 g of methyltrimethoxysilane (manufactured by Shin-Etsu Chemical Co., Ltd., trade name LS-530) was further added. Then, the whole was refluxed under heat for 1 hour to bond a methyldimethoxysilyl group to the surface of the modified anhydrous zinc antimonate colloidal particles. The obtained water-methanol mixed sol was poured into an evaporator with a recovery flask, and water was removed by evaporation at 600 Torr while adding methanol to the sol to obtain a methanol sol of modified anhydrous zinc antimonate colloidal particles having the surface bonded with diisobutylamine and a methyldimethoxysilyl group. The obtained methanol sol had a specific gravity of 0.964, a viscosity of 0.6 mPa·s, a pH of 4.6 (diluted with the same mass of water as that of the sol), a total metal oxide concentration of 20.9% by mass, and a water content of 0.32%. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a methyldimethoxysilyl group was obtained. The obtained sol had a specific gravity of 0.978, a viscosity of 1.0 mPa·s, a total metal oxide concentration of 20.5% by mass, a primary particle diameter of 10 to 25 nm under transmission electron microscope observation, and a particle diameter of 95 nm as measured by a dynamic light scattering method.

Example 7

To 107 g of the aqueous sol of anhydrous zinc antimonate colloidal particles prepared in Preparation Example 1 (an anhydrous zinc antimonate content of 36 g), 189 g of the alkaline aqueous sol of antimony pentoxide-silica composite colloidal particles and an oligomer of them prepared in Preparation Example 3 was added, and the whole was thoroughly stirred. Subsequently, the mixed sol was heated and aged at 95° C. for 2 hours to obtain an aqueous sol of modified anhydrous zinc antimonate colloidal particles coated with the antimony pentoxide-silica composite colloidal particles and the oligomer of them. The obtained sol had a pH of 7.5 and a total metal oxide concentration of 10.4% by mass. The obtained aqueous sol of modified anhydrous zinc antimonate colloidal particles coated with antimony pentoxide-silica composite colloidal particles and an oligomer of them was passed through a column packed with a hydrogen form cation exchange resin (Amberlite IR-120B) to obtain 500 g of an acidic aqueous sol of modified anhydrous zinc antimonate colloidal particles coated with antimony pentoxide-silica composite colloidal particles and an oligomer of them. The obtained sol had a pH of 2.4 and a total metal oxide concentration of 7.9% by mass. To the obtained sol, 0.4 g of diisobutylamine was added to bond diisobutylamine to a surface of the modified anhydrous zinc antimonate colloidal particles. At this time, the sol had a pH of 3.0. To the aqueous sol, the same mass of methanol as that of water in the sol was added, and 2.0 g of phenyltrimethoxysilane (manufactured by Momentive, TSL 8173) was further added. Then, the whole was refluxed under heat for 1 hour to bond a phenyldimethoxysilyl group to the surface of the modified anhydrous zinc antimonate colloidal particles. The obtained water-methanol mixed sol was poured into an evaporator with a recovery flask, and water was removed by evaporation at 600 Torr while adding methanol to the sol to obtain a methanol sol of modified anhydrous zinc antimonate colloidal particles having the surface bonded with diisobutylamine and a phenyldimethoxysilyl group. The obtained methanol sol had a specific gravity of 0.974, a viscosity of 1.5 mPa·s, a pH of 4.4 (diluted with the same mass of water as that of the sol), a total metal oxide concentration of 20.5% by mass, and a water content of 2.97%. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a phenyldimethoxysilyl group was obtained. The obtained sol had a specific gravity of 0.977, a viscosity of 1.0 mPa·s, a total metal oxide concentration of 20.5% by mass, a primary particle diameter of 10 to 25 nm under transmission electron microscope observation, and a particle diameter of 92 nm as measured by a dynamic light scattering method.

Example 8

To 107 g of the aqueous sol of anhydrous zinc antimonate colloidal particles prepared in Preparation Example 1 (an anhydrous zinc antimonate content of 36 g), 189 g of the alkaline aqueous sol of antimony pentoxide-silica composite colloidal particles and an oligomer of them prepared in Preparation Example 2 was added, and the whole was thoroughly stirred. Subsequently, the mixed sol was heated and aged at 95° C. for 2 hours to obtain an aqueous sol of modified anhydrous zinc antimonate colloidal particles coated with the antimony pentoxide-silica composite colloidal particles and the oligomer of them. The obtained sol had a pH of 7.5 and a total metal oxide concentration of 10.4% by mass. The obtained aqueous sol of modified anhydrous zinc antimonate colloidal particles coated with antimony pentoxide-silica composite colloidal particles and an oligomer of them was passed through a column packed with a hydrogen form cation exchange resin (Amberlite IR-120B) to obtain 500 g of an acidic aqueous sol of modified anhydrous zinc antimonate colloidal particles coated with antimony pentoxide-silica composite colloidal particles and an oligomer of them. The obtained sol had a pH of 2.4 and a total metal oxide concentration of 7.9% by mass. To the obtained sol, 0.4 g of diisobutylamine was added to bond diisobutylamine to a surface of the modified anhydrous zinc antimonate colloidal particles. At this time, the sol had a pH of 3.0. To the aqueous sol, the same mass of methanol as that of water in the sol was added, and 1.2 g of phenyltrimethoxysilane (manufactured by Momentive, TSL 8173) was further added. Then, the whole was refluxed under heat for 1 hour to bond a phenyldimethoxysilyl group to the surface of the modified anhydrous zinc antimonate colloidal particles. The obtained water-methanol mixed sol was poured into an evaporator with a recovery flask, and water was removed by evaporation at 600 Torr while adding methanol to the sol to obtain a methanol sol of modified anhydrous zinc antimonate colloidal particles having the surface bonded with diisobutylamine and a phenyldimethoxysilyl group. The obtained methanol sol had a specific gravity of 0.972, a viscosity of 1.0 mPa·s, a pH of 4.4 (diluted with the same mass of water as that of the sol), a total metal oxide concentration of 20.7% by mass, and a water content of 2.47%. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a phenyldimethoxysilyl group was obtained. The obtained sol had a specific gravity of 0.974, a viscosity of 1.0 mPa·s, a total metal oxide concentration of 20.8% by mass, a primary particle diameter of 10 to 25 nm under transmission electron microscope observation, and a particle diameter of 97 nm as measured by a dynamic light scattering method.

Example 9

To 119 g of the aqueous sol of anhydrous zinc antimonate colloidal particles prepared in Preparation Example 1 (an anhydrous zinc antimonate content of 40 g), 620 g of the alkaline aqueous sol of stannic oxide-silica composite colloidal particles and an oligomer of them prepared in Preparation Example 2 was added, and the whole was thoroughly stirred. Subsequently, the mixed sol was heated and aged at 95° C. for 2 hours to obtain an aqueous sol of modified anhydrous zinc antimonate colloidal particles coated with the stannic oxide-silica composite colloidal particles and the oligomer of them. The obtained sol had a pH of 7.7 and a total metal oxide concentration of 7.0% by mass. The obtained aqueous sol of modified anhydrous zinc antimonate colloidal particles was passed through a column packed with a hydrogen form cation exchange resin (Amberlite IR-120B) to obtain 800 g of an acidic aqueous sol of modified anhydrous zinc antimonate colloidal particles. The obtained sol had a pH of 2.5 and a total metal oxide concentration of 6.0% by mass. To the obtained sol, 0.5 g of diisobutylamine was added to bond diisobutylamine to a surface of the modified anhydrous zinc antimonate colloidal particles. At this time, the sol had a pH of 3.8. To the aqueous sol, the same mass of methanol as that of water in the sol was added, and 4.8 g of methyltrimethoxysilane (manufactured by Shin-Etsu Chemical Co., Ltd., trade name LS-530) was further added. Then, the whole was refluxed under heat for 6 hours to bond a methyldimethoxysilyl group to the surface of the modified anhydrous zinc antimonate colloidal particles. The obtained water-methanol mixed sol was poured into an evaporator with a recovery flask, and water was removed by evaporation at 600 Torr while adding methanol to the sol to obtain a methanol sol of modified anhydrous zinc antimonate colloidal particles having the surface bonded with diisobutylamine and a methyldimethoxysilyl group. The obtained methanol sol had a specific gravity of 1.070, a viscosity of 1.0 mPa·s, a pH of 4.8 (diluted with the same mass of water as that of the sol), a total metal oxide concentration of 30.5% by mass, and a water content of 0.49% by mass. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a phenyldimethoxysilyl group was obtained. The obtained sol had a specific gravity of 1.386, a viscosity of 2.2 mPa·s, a total metal oxide concentration of 50.5% by mass, a primary particle diameter of 10 to 25 nm under transmission electron microscope observation, and a particle diameter of 126 nm as measured by a dynamic light scattering method.

Example 10

To 237 g of the aqueous sol of anhydrous zinc antimonate colloidal particles prepared in Preparation Example 1 (an anhydrous zinc antimonate content of 80 g), 310 g of the alkaline aqueous sol of stannic oxide-silica composite colloidal particles and an oligomer of them prepared in Preparation Example 2 was added, and the whole was thoroughly stirred. Subsequently, the mixed sol was heated and aged at 95° C. for 2 hours to obtain an aqueous sol of modified anhydrous zinc antimonate colloidal particles coated with the stannic oxide-silica composite colloidal particles and the oligomer of them. The obtained sol had a pH of 8.2 and a total metal oxide concentration of 10.5% by mass. The obtained aqueous sol of modified anhydrous zinc antimonate colloidal particles was passed through a column packed with a hydrogen form cation exchange resin (Amberlite IR-120B) to obtain 866 g of an acidic aqueous sol of modified anhydrous zinc antimonate colloidal particles. The obtained sol had a pH of 2.9 and a total metal oxide concentration of 9.7% by mass. To the obtained sol, 0.4 g of diisobutylamine was added to bond diisobutylamine to a surface of the modified anhydrous zinc antimonate colloidal particles. At this time, the sol had a pH of 3.5. To the aqueous sol, the same mass of methanol as that of water in the sol was added, and 8.4 g of methyltrimethoxysilane (manufactured by Shin-Etsu Chemical Co., Ltd., trade name LS-530) was further added. Then, the whole was refluxed under heat for 6 hours to bond a methyldimethoxysilyl group to the surface of the modified anhydrous zinc antimonate colloidal particles. The obtained water-methanol mixed sol was poured into an evaporator with a recovery flask, and water was removed by evaporation at 600 Torr while adding methanol to the sol to obtain a methanol sol of modified anhydrous zinc antimonate colloidal particles having the surface bonded with diisobutylamine and a methyldimethoxysilyl group. The obtained methanol sol had a specific gravity of 1.084, a viscosity of 1.0 mPa·s, a pH of 4.4 (diluted with the same mass of water as that of the sol), a total metal oxide concentration of 30.5% by mass, and a water content of 1.88% by mass. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a phenyldimethoxysilyl group was obtained. The obtained sol had a specific gravity of 1.414, a viscosity of 1.4 mPa·s, a total metal oxide concentration of 50.4% by mass, a primary particle diameter of 10 to 25 nm under transmission electron microscope observation, and a particle diameter of 85 nm as measured by a dynamic light scattering method.

Example 11

To 237 g of the aqueous sol of anhydrous zinc antimonate colloidal particles prepared in Preparation Example 1 (an anhydrous zinc antimonate content of 80 g), 310 g of the alkaline aqueous sol of stannic oxide-silica composite colloidal particles and an oligomer of them prepared in Preparation Example 2 was added, and the whole was thoroughly stirred. Subsequently, the mixed sol was heated and aged at 95° C. for 2 hours to obtain an aqueous sol of modified anhydrous zinc antimonate colloidal particles coated with the stannic oxide-silica composite colloidal particles and the oligomer of them. The obtained sol had a pH of 8.2 and a total metal oxide concentration of 10.5% by mass. The obtained aqueous sol of modified anhydrous zinc antimonate colloidal particles was passed through a column packed with a hydrogen form cation exchange resin (Amberlite IR-120B) to obtain 866 g of an acidic aqueous sol of modified anhydrous zinc antimonate colloidal particles. The obtained sol had a pH of 2.9 and a total metal oxide concentration of 9.7% by mass. To the obtained sol, 0.4 g of diisobutylamine was added to bond diisobutylamine to a surface of the modified anhydrous zinc antimonate colloidal particles. At this time, the sol had a pH of 3.5. To the aqueous sol, the same mass of methanol as that of water in the sol was added, and 16.8 g of methyltrimethoxysilane (manufactured by Shin-Etsu Chemical Co., Ltd., trade name LS-530) was further added. Then, the whole was refluxed under heat for 6 hours to bond a methyldimethoxysilyl group to the surface of the modified anhydrous zinc antimonate colloidal particles. The obtained water-methanol mixed sol was poured into an evaporator with a recovery flask, and water was removed by evaporation at 600 Torr while adding methanol to the sol to obtain a methanol sol of modified anhydrous zinc antimonate colloidal particles having the surface bonded with diisobutylamine and a methyldimethoxysilyl group. The obtained methanol sol had a specific gravity of 1.084, a viscosity of 1.0 mPa·s, a pH of 4.4 (diluted with the same mass of water as that of the sol), a total metal oxide concentration of 30.5% by mass, and a water content of 1.88% by mass. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a phenyldimethoxysilyl group was obtained. The obtained sol had a specific gravity of 1.317, a viscosity of 1.0 mPa·s, a total metal oxide concentration of 50.5% by mass, a primary particle diameter of 10 to 25 nm under transmission electron microscope observation, and a particle diameter of 84 nm as measured by a dynamic light scattering method.

Example 12

To 237 g of the aqueous sol of anhydrous zinc antimonate colloidal particles prepared in Preparation Example 1 (an anhydrous zinc antimonate content of 80 g), 640 g of the alkaline aqueous sol of stannic oxide-silica composite colloidal particles and an oligomer of them prepared in Preparation Example 4 was added, and the whole was thoroughly stirred. Subsequently, the mixed sol was heated and aged at 95° C. for 2 hours to obtain an aqueous sol of modified anhydrous zinc antimonate colloidal particles coated with the stannic oxide-silica composite colloidal particles and the oligomer of them. The obtained sol had a pH of 8.2 and a total metal oxide concentration of 10.1% by mass. The obtained aqueous sol of modified anhydrous zinc antimonate colloidal particles was passed through a column packed with a hydrogen form cation exchange resin (Amberlite IR-120B) to obtain 946 g of an acidic aqueous sol of modified anhydrous zinc antimonate colloidal particles. The obtained sol had a pH of 2.8 and a total metal oxide concentration of 9.3% by mass. To the obtained sol, 0.4 g of diisobutylamine was added to bond diisobutylamine to a surface of the modified anhydrous zinc antimonate colloidal particles. At this time, the sol had a pH of 3.8. To the aqueous sol, the same mass of methanol as that of water in the sol was added, and 8.2 g of methyltrimethoxysilane (manufactured by Shin-Etsu Chemical Co., Ltd., trade name LS-530) was further added. Then, the whole was refluxed under heat for 6 hours to bond a methyldimethoxysilyl group to the surface of the modified anhydrous zinc antimonate colloidal particles. The obtained water-methanol mixed sol was poured into an evaporator, with a recovery flask, and water was removed by evaporation at 600 Torr while adding methanol to the sol to obtain a methanol sol of modified anhydrous zinc antimonate colloidal particles having the surface bonded with diisobutylamine and a methyldimethoxysilyl group. The obtained methanol sol had a specific gravity of 1.068, a viscosity of 1.0 mPa·s, a pH of 4.5 (diluted with the same mass of water as that of the sol), a total metal oxide concentration of 30.5% by mass, and a water content of 0.90% by mass. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a phenyldimethoxysilyl group was obtained. The obtained sol had a specific gravity of 1.402, a viscosity of 1.1 mPa·s, a total metal oxide concentration of 50.5% by mass, a primary particle diameter of 10 to 25 nm under transmission electron microscope observation, and a particle diameter of 85 nm as measured by a dynamic light scattering method.

Example 13

To 237 g of the aqueous sol of anhydrous zinc antimonate colloidal particles prepared in Preparation Example 1 (an anhydrous zinc antimonate content of 80 g), 640 g of the alkaline aqueous sol of stannic oxide-silica composite colloidal particles and an oligomer of them prepared in Preparation Example 4 was added, and the whole was thoroughly stirred. Subsequently, the mixed sol was heated and aged at 95° C. for 2 hours to obtain an aqueous sol of modified anhydrous zinc antimonate colloidal particles coated with the stannic oxide-silica composite colloidal particles and the oligomer of them. The obtained sol had a pH of 8.1 and a total metal oxide concentration of 10.3% by mass. The obtained aqueous sol of modified anhydrous zinc antimonate colloidal particles was passed through a column packed with a hydrogen form cation exchange resin (Amberlite IR-120B) to obtain 863 g of an acidic aqueous sol of modified anhydrous zinc antimonate colloidal particles. The obtained sol had a pH of 2.8 and a total metal oxide concentration of 10.2% by mass. To the obtained sol, 0.5 g of diisobutylamine was added to bond diisobutylamine to a surface of the modified anhydrous zinc antimonate colloidal particles. At this time, the sol had a pH of 3.6. To the aqueous sol, the same mass of methanol as that of water in the sol was added, and 12.8 g of phenyltrimethoxysilane (manufactured by Momentive, TSL 8173) was further added. Then, the whole was refluxed under heat for 6 hours to bond a phenyldimethoxysilyl group to the surface of the modified anhydrous zinc antimonate colloidal particles. The obtained water-methanol mixed sol was poured into an evaporator with a recovery flask, and water was removed by evaporation at 600 Torr while adding methanol to the sol to obtain a methanol sol of modified anhydrous zinc antimonate colloidal particles having the surface bonded with diisobutylamine and a phenyldimethoxysilyl group. The obtained methanol sol had a specific gravity of 1.068, a viscosity of 1.0 mPa·s, a pH of 4.6 (diluted with the same mass of water as that of the sol), a total metal oxide concentration of 30.5% by mass, and a water content of 0.10% by mass. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a phenyldimethoxysilyl group was obtained. The obtained sol had a specific gravity of 1.218, a viscosity of 1.0 mPa·s, a total metal oxide concentration of 40.1% by mass, a primary particle diameter of 10 to 25 nm under transmission electron microscope observation, and a particle diameter of 84 nm as measured by a dynamic light scattering method.

Example 14

To 237 g of the aqueous sol of anhydrous zinc antimonate colloidal particles prepared in Preparation Example 1 (an anhydrous zinc antimonate content of 80 g), 640 g of the alkaline aqueous sol of stannic oxide-silica composite colloidal particles and an oligomer of them prepared in Preparation Example 5 was added, and the whole was thoroughly stirred. Subsequently, the mixed sol was heated and aged at 95° C. for 2 hours to obtain an aqueous sol of modified anhydrous zinc antimonate colloidal particles coated with the stannic oxide-silica composite colloidal particles and the oligomer of them. The obtained sol had a pH of 8.1 and a total metal oxide concentration of 10.2% by mass. The obtained aqueous sol of modified anhydrous zinc antimonate colloidal particles was passed through a column packed with a hydrogen form cation exchange resin (Amberlite IR-120B) to obtain 951 g of an acidic aqueous sol of modified anhydrous zinc antimonate colloidal particles. The obtained sol had a pH of 2.8 and a total metal oxide concentration of 9.3% by mass. To the obtained sol, 0.6 g of diisobutylamine was added to bond diisobutylamine to a surface of the modified anhydrous zinc antimonate colloidal particles. At this time, the sol had a pH of 3.9. To the aqueous sol, the same mass of methanol as that of water in the sol was added, and 8.8 g of methyltrimethoxysilane (manufactured by Shin-Etsu Chemical Co., Ltd., trade name LS-530) was further added. Then, the whole was refluxed under heat for 6 hours to bond a methyldimethoxysilyl group to the surface of the modified anhydrous zinc antimonate colloidal particles. The obtained water-methanol mixed sol was poured into an evaporator with a recovery flask, and water was removed by evaporation at 600 Torr while adding methanol to the sol to obtain a methanol sol of modified anhydrous zinc antimonate colloidal particles having the surface bonded with diisobutylamine and a methyldimethoxysilyl group. The obtained methanol sol had a specific gravity of 1.068, a viscosity of 1.0 mPa·s, a pH of 4.9 (diluted with the same mass of water as that of the sol), a total metal oxide concentration of 30.5% by mass, and a water content of 0.16% by mass. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a phenyldimethoxysilyl group was obtained. The obtained sol had a specific gravity of 1.400, a viscosity of 1.2 mPa·s, a total metal oxide concentration of 50.5% by mass, a primary particle diameter of 10 to 25 nm under transmission electron microscope observation, and a particle diameter of 84 nm as measured by a dynamic light scattering method.

Example 15

To 237 g of the aqueous sol of anhydrous zinc antimonate colloidal particles prepared in Preparation Example 1 (an anhydrous zinc antimonate content of 80 g), 640 g of the alkaline aqueous sol of stannic oxide-silica composite colloidal particles and an oligomer of them prepared in Preparation Example 5 was added, and the whole was thoroughly stirred. Subsequently, the mixed sol was heated and aged at 95° C. for 2 hours to obtain an aqueous sol of modified anhydrous zinc antimonate colloidal particles coated with the stannic oxide-silica composite colloidal particles and the oligomer of them. The obtained sol had a pH of 8.1 and a total metal oxide concentration of 10.4% by mass. The obtained aqueous sol of modified anhydrous zinc antimonate colloidal particles was passed through a column packed with a hydrogen form cation exchange resin (Amberlite IR-120B) to obtain 863 g of an acidic aqueous sol of modified anhydrous zinc antimonate colloidal particles. The obtained sol had a pH of 2.8 and a total metal oxide concentration of 10.2% by mass. To the obtained sol, 0.5 g of diisobutylamine was added to bond diisobutylamine to a surface of the modified anhydrous zinc antimonate colloidal particles. At this time, the sol had a pH of 3.6. To the aqueous sol, the same mass of methanol as that of water in the sol was added, and 12.8 g of phenyltrimethoxysilane (manufactured by Momentive, TSL 8173) was further added. Then, the whole was refluxed under heat for 6 hours to bond a phenyldimethoxysilyl group to the surface of the modified anhydrous zinc antimonate colloidal particles. The obtained water-methanol mixed sol was poured into an evaporator with a recovery flask, and water was removed by evaporation at 600 Torr while adding methanol to the sol to obtain a methanol sol of modified anhydrous zinc antimonate colloidal particles having the surface bonded with diisobutylamine and a phenyldimethoxysilyl group. The obtained methanol sol had a specific gravity of 1.068, a viscosity of 1.3 mPa·s, a pH of 4.6 (diluted with the same mass of water as that of the sol), a total metal oxide concentration of 30.5% by mass, and a water content of 0.21% by mass. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a phenyldimethoxysilyl group was obtained. The obtained sol had a specific gravity of 1.083, a viscosity of 1.0 mPa·s, a total metal oxide concentration of 30.7% by mass, a primary particle diameter of 10 to 25 nm under transmission electron microscope observation, and a particle diameter of 92 nm as measured by a dynamic light scattering method.

Example 16

To 237 g of the aqueous sol of anhydrous zinc antimonate colloidal particles prepared in Preparation Example 1 (an anhydrous zinc antimonate content of 80 g), 320 g of the alkaline aqueous sol of stannic oxide-silica composite colloidal particles and an oligomer of them prepared in Preparation Example 2 was added, and the whole was thoroughly stirred. Subsequently, the mixed sol was heated and aged at 95° C. for 2 hours to obtain an aqueous sol of modified anhydrous zinc antimonate colloidal particles coated with the stannic oxide-silica composite colloidal particles and the oligomer of them. The obtained sol had a pH of 8.2 and a total metal oxide concentration of 10.5% by mass. The obtained aqueous sol of modified anhydrous zinc antimonate colloidal particles was passed through a column packed with a hydrogen form cation exchange resin (Amberlite IR-120B) to obtain 884 g of an acidic aqueous sol of modified anhydrous zinc antimonate colloidal particles. The obtained sol had a pH of 2.8 and a total metal oxide concentration of 9.5% by mass. To the obtained sol, 0.4 g of diisobutylamine was added to bond diisobutylamine to a surface of the modified anhydrous zinc antimonate colloidal particles. At this time, the sol had a pH of 3.5. To the aqueous sol, the same mass of methanol as that of water in the sol was added, and 8.4 g of methyltrimethoxysilane (manufactured by Shin-Etsu Chemical Co., Ltd., trade name LS-530) was further added. Then, the whole was refluxed under heat for 6 hours to bond a methyldimethoxysilyl group to the surface of the modified anhydrous zinc antimonate colloidal particles. The obtained water-methanol mixed sol was poured into an evaporator with a recovery flask, and water was removed by evaporation at 600 Torr while adding methanol to the sol to obtain a methanol sol of modified anhydrous zinc antimonate colloidal particles having the surface bonded with diisobutylamine and a methyldimethoxysilyl group. The obtained methanol sol had a specific gravity of 1.082, a viscosity of 1.0 mPa·s, a pH of 4.5 (diluted with the same mass of water as that of the sol), a total metal oxide concentration of 30.5% by mass, and a water content of 1.88% by mass. Subsequently, methanol was removed by evaporation using the evaporator at 70 Torr while adding methyl ethyl ketone to replace methanol with methyl ethyl ketone, and thus a methyl ethyl ketone sol of modified anhydrous zinc antimonate colloidal particles having the surface bonded with diisobutylamine and a phenyldimethoxysilyl group was obtained. The obtained sol had a specific gravity of 1.406, a viscosity of 1.0 mPa·s, a total metal oxide concentration of 50.5% by mass, a primary particle diameter of 10 to 25 nm under transmission electron microscope observation, and a particle diameter of 91 nm as measured by a dynamic light scattering method.

Comparative Example 1

To 402 g of the aqueous sol of anhydrous zinc antimonate colloidal particles obtained in Preparation Example 1, 28.0 g of methyltrimethoxysilane (manufactured by Shin-Etsu Chemical Co., Ltd., trade name LS-530) was added, and the whole was stirred with a disperser at room temperature for 5 hours for thoroughly mixing. Subsequently, to the mixture, 3.1 g of diisopropylamine and 5.1 g of malic acid were added, and the whole was stirred and mixed with a disperser at room temperature for 2 hours. Thus, an aqueous sol of anhydrous zinc antimonate colloidal particles having a surface coated with diisopropylamine and a methyldimethoxysilyl group was obtained. The aqueous sol had a pH of 4.0. The solvent of the obtained aqueous sol was replaced with methanol using an evaporator with a recovery flask, and further replaced with methyl ethyl ketone. The obtained methyl ethyl ketone sol of anhydrous zinc antimonate colloidal particles having the surface coated with diisopropylamine, methyltrimethoxysilane, and a methyldimethoxysilyl group had an excessively high viscosity, and thus the viscosity could not be determined with an Ostwald viscometer. The viscosity was determined as 100 mPa·s or more with a B-type viscometer. The primary particle diameter was 10 to 20 nm under transmission electron microscope observation. The particle diameter was 904 nm as measured by a dynamic light scattering method and showed remarkable aggregation.

Comparative Example 2

The methanol replacement was carried out in the same manner as in Example 1 except that diisobutylamine was not added to the acidic aqueous sol of modified anhydrous zinc antimonate colloidal particles. The sol gelated during the replacement to methanol, and thus the methyl ethyl ketone sol could not be obtained.

Comparative Example 3

The production was carried out in the same manner as in Example 1 except that methyltrimethoxysilane was not added to the methanol sol of modified anhydrous zinc antimonate colloidal particles bonded with diisobutylamine. The sol gelated during the replacement to methyl ethyl ketone, and thus the methyl ethyl ketone sol could not be obtained.

Examples 1 to 16 and Comparative Examples 1 to 3 are listed in Table 1 and Table 2.

TABLE 1

|  | SiO$_2$/SnO$_2$ (% by mass) | ZnSb$_2$O$_6$/SnO$_2$—SiO$_2$ (% by mass) | Organosilicon compound | Organosilicon compound/(C) mass ratio | Amine compound/(C) mass ratio | MEK-dispersed sol (*1) Viscosity (mPa·s) | MEK-dispersed sol (*1) Particle diameter (nm) (*2) |
|---|---|---|---|---|---|---|---|
| Example 1 | 2 | 10 | MTMS | 0.10 | 0.007 | 1.3 | 85 |
| Example 2 | 2 | 10 | MTMS | 0.05 | 0.004 | 1.0 | 90 |
| Example 3 | 2 | 10 | PTMS | 0.05 | 0.004 | 1.0 | 78 |
| Example 4 | 2 | 10 | PTMS | 0.03 | 0.004 | 1.1 | 81 |
| Example 9 | 2 | 5 | MTMS | 0.10 | 0.010 | 2.2 | 126 |
| Example 10 | 2 | 20 | MTMS | 0.10 | 0.005 | 1.4 | 85 |
| Example 11 | 2 | 20 | MTMS | 0.30 | 0.005 | 1.0 | 84 |
| Example 12 | 4 | 10 | MTMS | 0.10 | 0.005 | 1.1 | 85 |
| Example 13 | 4 | 10 | PTMS | 0.15 | 0.006 | 1.0 | 84 |
| Example 14 | 8 | 10 | MTMS | 0.10 | 0.007 | 1.2 | 84 |
| Example 15 | 8 | 10 | PTMS | 0.15 | 0.006 | 1.0 | 92 |
| Example 16 | 8 | 20 | MTMS | 0.10 | 0.005 | 1.0 | 91 |
| Comparative Example 1 | — | — | MTMS | 0.21 | 0.023 | 100 or more | 904 |
| Comparative Example 2 | 2 | 10 | MTMS | 0.10 | — | — | — |
| Comparative Example 3 | 2 | 10 | MTMS | — | 0.007 | — | — |

MTMS: methyltrimethoxysilane, PTMS: phenyltrimethoxysilane
(*1) Methyl ethyl ketone-dispersed sol
(*2) Particle diameter: by dynamic light scattering method

TABLE 2

|  | SiO$_2$/Sb$_2$O$_5$ (% by mass) | ZnSb$_2$O$_6$/Sb$_2$O$_5$—SiO$_2$ (% by mass) | Organosilicon compound | Organosilicon compound/(C) mass ratio | Amine compound/(C) mass ratio | MEK-dispersed sol (*1) Viscosity (mPa·S) | MEK-dispersed sol (*1) Particle diameter (nm) (*2) |
|---|---|---|---|---|---|---|---|
| Example 5 | 2 | 10 | MTMS | 0.10 | 0.010 | 1.1 | 103 |
| Example 6 | 2 | 10 | MTMS | 0.05 | 0.010 | 1.0 | 95 |
| Example 7 | 2 | 10 | PTMS | 0.05 | 0.010 | 1.0 | 92 |
| Example 8 | 2 | 10 | PTMS | 0.03 | 0.010 | 1.0 | 97 |

MTMS: methyltrimethoxysilane, PTMS: phenyltrimethoxysilane
(*1) Methyl ethyl ketone-dispersed sol
(*2) Particle diameter: by dynamic light scattering method

The invention claimed is:

1. A hydrophobic organic solvent-dispersed sol of surface-modified anhydrous zinc antimonate colloidal particles comprising:
a hydrophobic organic solvent having a water solubility of from 0.002 to 12% by mass; and
surface-modified anhydrous zinc antimonate colloidal particles dispersed in the hydrophobic organic solvent, the surface-modified anhydrous zinc antimonate colloidal particles comprising:
cores of anhydrous zinc antimonate colloidal particles (A) coated with at least one substance (B), the cores coated with the at least one substance (B) forming modified anhydrous zinc antimonate colloidal particles (C); and
an organosilicon compound and an amine compound bonded to a surface of the modified anhydrous zinc antimonate colloidal particles (C),
wherein the at least one substance (B) is selected from the group consisting of
colloidal particles of a composite oxide containing silica and stannic oxide or silica and antimony pentoxide at a silica/stannic oxide or silica/antimony pentoxide mass ratio of 0.1 to 10,
an oligomer of the colloidal particles of a composite oxide, and
a mixture of the colloidal particles of a composite oxide and the oligomer of the colloidal particles of a composite oxide.

2. The hydrophobic organic solvent-dispersed sol according to claim 1, wherein
a mass ratio of the organosilicon compound to the modified anhydrous zinc antimonate colloidal particles (C) is 0.01 to 0.50, and
a mass ratio of the amine compound to the modified anhydrous zinc antimonate colloidal particles (C) is 0.001 to 0.05.

3. The hydrophobic organic solvent-dispersed sol according to claim 1, wherein the organosilicon compound is at least one compound selected from the group consisting of an organosilicon compound of General Formula (I)

$$(R^1)_a(R^3)_b Si(OR^2)_{4-(a+b)} \tag{I}$$

(where each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group, or a cyano group and is bonded to the silicon atom through a Si—C bond, $R^2$ is a $C_{1-8}$ alkyl, alkoxyalkyl, or acyl group, each of a and b is an integer of 0, 1, or 2, and a+b is an integer of 0, 1, or 2, and/or General Formula (II)

$$[(R^4)_c Si(OX)_{3-c}]_2 Y \tag{II}$$

(where $R^4$ is a $C_{1-5}$ alkyl group, X is a $C_{1-4}$ alkyl or acyl group, Y is a $C_{1-20}$ alkylene group, and c is an integer of 0 or 1; and a hydrolysis product thereof.

4. The hydrophobic organic solvent-dispersed sol according to claim 1, wherein the amine compound is at least one compound selected from the group consisting of a primary amine, a secondary amine, and a tertiary amine.

5. The hydrophobic organic solvent-dispersed sol according to claim 1, wherein the hydrophobic organic solvent is at least one compound selected from the group consisting of ketones, esters, hydrocarbons, halogenated hydrocarbons, and polyoxyalkylenedicarboxylic acid alkyl esters.

6. The hydrophobic organic solvent-dispersed sol according to claim 1, wherein the hydrophobic organic solvent is at least one compound selected from the group consisting of 1-pentanol, methyl ethyl ketone, methyl isobutyl ketone, cyclohexanone, ethyl acetate, butyl acetate, methyl methacrylate, diisopropyl ether, toluene, triethylene glycol di-2-ethylhexanoate (3GO), triethylene glycol di-2-ethylbutyrate (3 GH), tetraethylene glycol diheptanoate (4G7), and tetraethylene glycol di-2-ethylhexanoate (4GO).

7. A method for producing the hydrophobic organic solvent-dispersed sol according to claim 1, the method comprising:
(a) obtaining a hydrophilic solvent-dispersed sol of the modified anhydrous zinc antimonate colloidal particles (C), the (a) including:
mixing a hydrophilic solvent-dispersed sol of the anhydrous zinc antimonate colloidal particles (A) and a hydrophilic solvent-dispersed sol of the at least one substance (B) at an (A)/(B) mass ratio of 2 to 50; and
coating the anhydrous zinc antimonate colloidal particles (A) with the at least one substance (B); oligomer;
(b) cation-exchanging the hydrophilic solvent-dispersed sol of the modified anhydrous zinc antimonate colloidal particles (C) obtained in the (a);
(c) obtaining a hydrophilic solvent-dispersed sol containing surface-modified zinc antimonate colloidal particles formed by bonding the organosilicon compound and the amine compound to the surface of the modified anhydrous zinc antimonate colloidal particles (C), the (c) including:
adding, to an acidic hydrophilic solvent-dispersed sol of the modified anhydrous zinc antimonate colloidal particles (C) obtained in the (b), at least one organosilicon compound selected from the group consisting of an organosilicon compound of
General Formula (I)

$(R^1)_a(R^3)_b Si(OR^2)_{4-(a+b)}$     (I)

(where each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group, or a cyano group and is bonded to the silicon atom through a Si—C bond, $R^2$ is a $C_{1-8}$ alkyl, alkoxyalkyl, or acyl group, each of a and b is an integer of 0, 1, or 2, and a+b is an integer of 0, 1, or 2, and/or General Formula (II)

$[(R^4)_c Si(OX)_{3-c}]_2 Y$     (II)

(where $R^4$ is a $C_{1-5}$ alkyl group, X is a $C_{1-4}$ alkyl or acyl group, Y is a $C_{1-20}$ alkylene group, and c is an integer of 0 or 1; and a hydrolysis product thereof; and
making a mass ratio of the organosilicon compound to the modified anhydrous zinc antimonate colloidal particles (C) of 0.01 to 0.50 and a mass ratio of the amine compound to the modified anhydrous zinc antimonate colloidal particles (C) of 0.001 to 0.05; and (d) replacing a dispersion medium of the hydrophilic solvent-dispersed sol obtained in the (c) with the hydrophobic organic solvent having a water solubility of 0.002 to 12% by mass.

8. The method for producing the hydrophobic organic solvent-dispersed sol according to claim 7, wherein the amine compound is at least one compound selected from the group consisting of a primary amine, a secondary amine, and a tertiary amine.

9. The method for producing the hydrophobic organic solvent-dispersed sol according to claim 7, wherein the hydrophobic organic solvent is at least one compound selected from the group consisting of ketones, esters, hydrocarbons, halogenated hydrocarbons, and polyoxyalkylenedicarboxylic acid alkyl esters.

10. The method for producing the hydrophobic organic solvent-dispersed sol according to claim 7, wherein the hydrophobic organic solvent is at least one compound selected from the group consisting of 1-pentanol, methyl ethyl ketone, methyl isobutyl ketone, cyclohexanone, ethyl acetate, butyl acetate, methyl methacrylate, diisopropyl ether, toluene, triethylene glycol di-2-ethylhexanoate (3GO), triethylene glycol di-2-ethylbutyrate (3 GH), tetraethylene glycol diheptanoate (4G7), and tetraethylene glycol di-2-ethylhexanoate (4GO).

11. The method for producing the hydrophobic organic solvent-dispersed sol according to claim 7, wherein the hydrophilic solvent-dispersed sol of the modified anhydrous zinc antimonate colloidal particles (C) that are formed by coating the anhydrous zinc antimonate colloidal particles (A) with the at least one substance (B) is made to have a pH of 6 to 11 in the (a).

* * * * *